(12) United States Patent
Okabayashi et al.

(10) Patent No.: US 6,358,391 B1
(45) Date of Patent: Mar. 19, 2002

(54) METHOD FOR MAKING ANODE FOIL FOR ALUMINUM ELECTROLYTIC CAPACITOR

(75) Inventors: Masanori Okabayashi, Uji; Katsunori Matsuda, Nara; Kazuo Okamura, Joyo; Seita Takahashi, Hirakata, all of (JP)

(73) Assignee: Matsushita Electric Industrial CO, Ltd. (JP)

( * ) Notice: Subject to any disclaimer, the term of this patent is extended or adjusted under 35 U.S.C. 154(b) by 0 days.

(21) Appl. No.: 09/334,772

(22) Filed: Jun. 16, 1999

(30) Foreign Application Priority Data

Jun. 18, 1998 (JP) .......................................... 10-171057
May 12, 1999 (JP) .......................................... 11-130923

(51) Int. Cl.[7] .............................. C25D 11/12; C25D 5/48
(52) U.S. Cl. ...................................... 205/175; 205/229
(58) Field of Search ................................... 205/175, 229

(56) References Cited

FOREIGN PATENT DOCUMENTS

| JP | 62-18029 | 5/1987 |
| JP | 62-20997 | 5/1987 |
| JP | 3-81292 | 12/1991 |
| JP | 8-27549 A | * 1/1996 |

OTHER PUBLICATIONS

*Abstract only.*

* cited by examiner

*Primary Examiner*—Edna Wong
(74) *Attorney, Agent, or Firm*—Parkhurst & Wendel, L.L.P

(57) ABSTRACT

A method for making an anode foil for an aluminum electrolytic capacitor which comprises a first anodizing step of forming an anodized film on the surface of an aluminum foil, an immersion treatment step of immersing this aluminum foil in an aqueous solution containing alkaline metal ions, a step of feeding an electric current to the aluminum foil from a current feeding cell 3 having a current feeding solution 6 and a current feeding electrode 5 connected to the anode of a direct-current power source 7, and a second anodizing step of forming by applying a higher voltage than in the first anodizing step.

6 Claims, 3 Drawing Sheets ing numerous film defects, and the aluminum foil having alkaline metal ions depositing on its surface is immersed in the current feeding solution in the current feeding cell. In the current feeding cell, the aluminum foil acts as the cathode, and therefore the alkaline metal ions charged positively gather on the surface of the aluminum foil without dispersing in the current feeding solution in the current feeding cell. Therefore, it is alkaline locally, and the anodized film is dissolved. In particular, in the chemical film defect areas, defects are exposed, and the current feeding solution penetrates into the exposed defects, and the film resistance becomes smaller. As a result, if the anodizing voltage is high, the resistance of the anodized film can be lowered, and the current density in the current feeding cell is uniform, and the bath voltage in the current feeding cell drops. At the same time, the generated hydrogen is released to the current feeding solution side through the exposed defects, and occurrence of hydrogen embrittlement is prevented, and the amount of feeding current in the current feeding cell is increased. Therefore, the limitation of the first anodizing voltage is lifted, and the installation of insulating shielding plate is not necessary, and also the power consumption is saved and the productivity is enhanced.

METHOD FOR MAKING ANODE FOIL FOR ALUMINUM ELECTROLYTIC CAPACITOR

BACKGROUND OF THE INVENTION

The present invention relates to a method for making an anode foil for an aluminum electrolytic capacitor used in various electronic appliances.

In the conventional manufacturing- process of an anode foil for an aluminum electrolytic capacitor, to feed current in the anodizing step, an aluminum foil of which surface is roughened by etching is brought into contact with a current feeding roller to feed current. In this method, however, aluminum powder may deposit on the surface of the current feeding roller, or spark discharge may occur between the current feeding roller and the aluminum foil, when an amount of feeding current is increased.

To solve these problems, a method of feeding current in aqueous solution is proposed. For example, Japanese Patent Publication No. 03-81292 (1991) discloses an art of anodization by conveying an aluminum foil in the sequence of a step of forming false boehmite by immersion treatment in a high-temperature deionized water, a first anodizing step of applying a anodizing voltage in a range of 10 to 100 V, a step of feeding current to the aluminum foil in a current feeding cell, and a second anodizing step. However, when current is fed in a current feeding cell in which a current feeding electrode is disposed, the current may be locally concentrated between the electrode and aluminum foil, and, in this portion, the aluminum foil may be distorted or the end may be torn due to hydrogen embrittlement. As practical means for preventing this phenomenon, electrochemical forming apparatuses disposing electrical insulating shielding plates are proposed in Japanese Utility Model Publication Nos. 62-20997 (1987) and 62-18029 (1987).

However, in such conventional anodizing methods of using the current feeding cell disposing the current feeding electrode, when the amount of feeding current from the current feeding cell increases, even if the voltage range of the first anodizing step is defined or the insulating shielding plate is disposed, distortion of aluminum foil or tearing of end portion due to current concentration may be caused. The higher the anodizing voltage in the first anodizing step, the higher is the value of resistance of the anodized film, and it causes to elevate the bath voltage in the current feeding cell or promote the phenomenon of hydrogen embrittlement due to current concentration, or the power consumption in the current feeding cell may be increased.

SUMMARY OF THE INVENTION

A first aspect of the invention relates to a method for making an anode foil which comprises a first anodizing step of forming an anodized film on the surface of an aluminum foil, an immersion treatment step of immersing the aluminum foil in an aqueous solution containing an alkaline metal compound, a current feeding step of feeding an electric current to the aluminum foil in a current feeding solution in a current feeding cell disposing a current feeding electrode connected to the anode of a direct current power source, and a second anodizing step of forming an anodized film on the surface of the aluminum foil by applying a higher voltage than the voltage in the first anodizing step.

According to this anodizing manufacturing method while continuously conveying the aluminum foil roughened on the surface, the anodized film formed on the surface of the aluminum foil in the first anodizing step is immersed in the aqueous solution containing alkaline metal ions while hav- In order to obtain better effects, the alkaline metal compound to be added in the aqueous solution in the immersion treatment step is preferred to be any compound of Li, Na, K, Rb, or Cs. The concentration of the alkaline metal compound to be added in the aqueous solution in the immersion treatment step is preferred to be 0.1 ppm or more.

A second aspect of the invention relates to a method for making an anode foil, for forming an anodized film while continuously conveying an aluminum foil of which surface is roughened, which comprises a first anodizing step of forming an anodized film on the surface of an aluminum foil, a current feeding step of feeding an electric current to the aluminum foil in a current feeding solution containing an alkaline metal compound in a current feeding cell disposing a current feeding electrode connected to the anode of a direct-current power source, and a second anodizing step of forming an anodized film on the surface of the aluminum foil by applying a higher voltage than the voltage in the first electrochemical forming step.

According to this manufacturing method, the anodized film formed on the surface of the aluminum foil in the first anodizing step is immersed in the current feeding solution in the current feeding cell while having numerous film defects, and the aluminum foil acts as the cathode in the current feeding cell. Therefore, the alkaline metal ions charged positively gather on the surface of the aluminum foil, and it is alkaline locally, and the anodized film is dissolved. In particular, in the anodized film defect areas, defects are exposed, and the current feeding solution penetrates into the exposed defects, and the film resistance becomes smaller. As a result, if the first anodizing voltage is high, the resistance of the anodized film can be lowered, and the current density in the current feeding cell is uniform, and the bath voltage in the current feeding cell drops. At the same time, the generated hydrogen is released to the current feeding solution side through the exposed defects, and occurrence of hydrogen embrittlement is prevented, and the amount of feeding current in the current feeding cell is increased. Therefore, the limitation of the first anodizing voltage is lifted, and the installation of insulating shielding plate is not necessary, and also the power consumption is saved and the productivity is enhanced.

In order to obtain better effects, the alkaline metal compound to be added in the current feeding solution in the current feeding step is preferred to be any compound of Li, Na, K, Rb, or Cs. The concentration of the alkaline metal compound to be added in the aqueous solution in the current feeding step is preferred to be 0.1 ppm or more.

BRIEF DESCRIPTION OF THE DRAWINGS

FIG. 1 shows a method of adding an alkaline metal compound in an immersion cell, and feeding current by keeping an aluminum foil in contact with a current feeding roller.

FIG. 2 shows a method of adding an alkaline metal compound in an immersion cell, and feeding current by immersing aluminum foil in a current feeding solution in a current feeding cell.

FIG. 3 shows a method of adding an alkaline metal compound in a current feeding cell, and feeding current by keeping an aluminum foil in contact with a current feeding roller.

FIG. 4 shows a method of adding an alkaline metal compound in a current feeding cell, and feeding current by immersing an aluminum foil in a current feeding solution in a current feeding cell.

DESCRIPTION OF THE PREFERRED EMBODIMENTS

Figure 1:
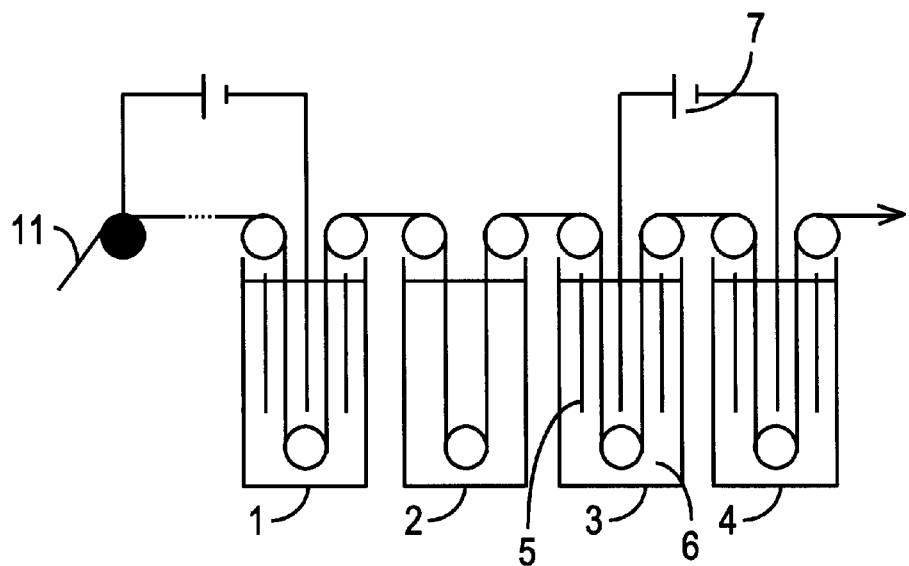
FIG. 1, FIG. 2, FIG. 3, and FIG. 4 are conceptual diagrams of a manufacturing apparatus for explaining a method of making an anode foil for an aluminum electrolytic capacitor according to embodiments of the invention.
Figure 2:
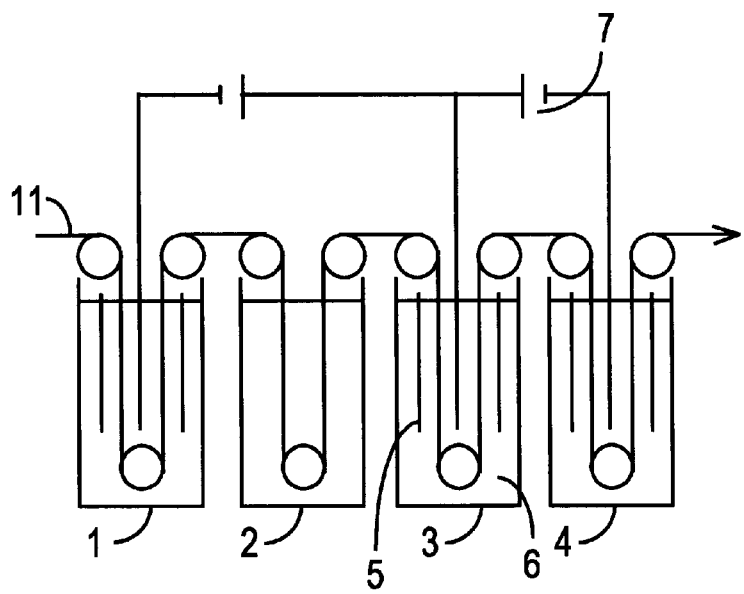
Figure 3:
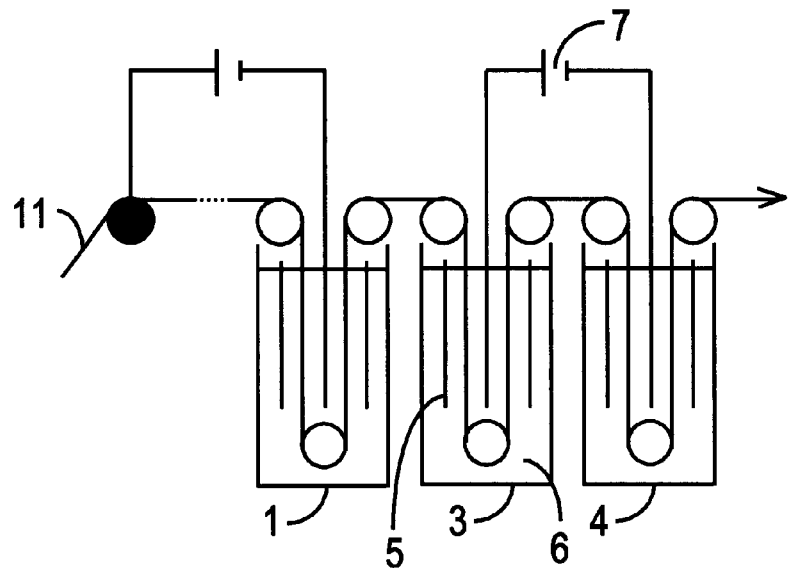
Figure 4:
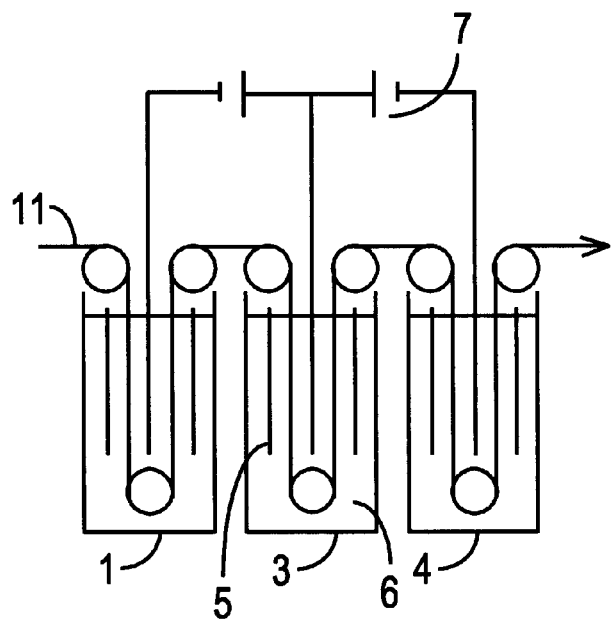

The manufacturing apparatus shown in FIG. 1 to FIG. 4 comprises a first anodizing cell 1 for performing a first anodizing step, an immersion cell 2 filled with an aqueous solution containing an alkaline metal compound for performing an immersion treatment step, a current feeding cell 3 for performing a current feeding step, a second anodizing cell 4 for performing a second anodizing step, a current feeding electrode 5 disposed in the current feeding cell 3, a current feeding solution 6 contained in the current feeding cell 3, and a direct-current power source 7 to which the current feeding electrode 5 is connected. As an aluminum foil 11 is conveyed through these cells 1, 2, 3 and 4, an anode foil is anodized continuously.

Referring now to FIG. 1 to FIG. 4 and FIG. 5(a) to FIG. 5(c), a method of making an anode film for an aluminum electrolytic capacitor is described in detail below.

Figure 5A:
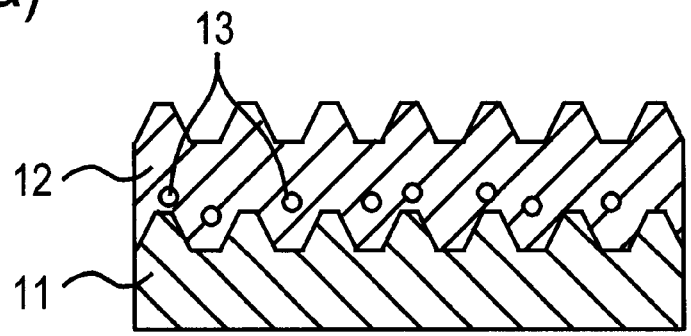
FIG. 5(a) is a schematic diagram of a dielectric oxide film formed in a first electrochemical forming step in an embodiment of the invention.

First, the aluminum foil 11 is sent into the first anodizing cell 1 and is processed electrochemically. At this time, as shown in FIG. 5(a), an anodized film 12 is formed on the surface of the aluminum foil 11 in the first anodizing step. The anodized film 12 has film defects 13.

Figure 5B:
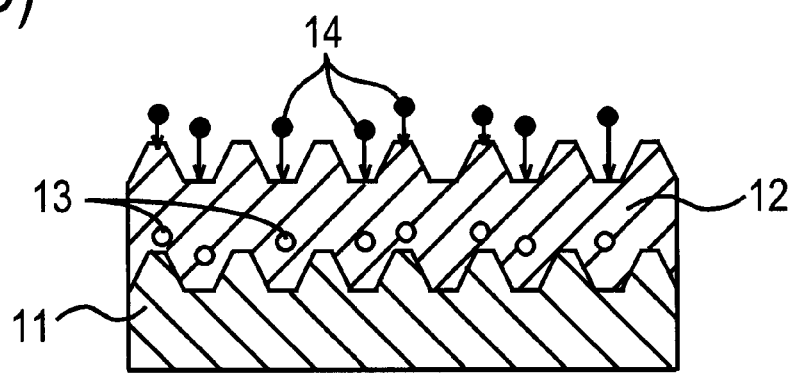
FIG. 5(b) is a schematic diagram of a process of sodium ions approaching the surface of anodized film in the current feeding cell thereof.
Figure 5C:
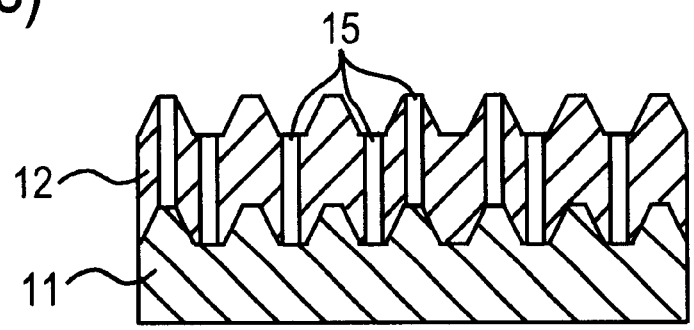
FIG. 5(c) is a schematic diagram of a process of exposing defects as sodium ions dissolve defect areas of the anodized film.

After the first anodizing step, the aluminum foil 11 is sent into the immersion cell 2 and current feeding cell 3. At this time, as shown in FIG. 5(b), sodium ions 14 as alkaline metal ions added in the immersion cell 2 or current feed cell 3 deposit on the surface of the anodized film 12, and the sodium ions 14 approach the surface of the anodized film 12 acting as a cathode in the current feeding cell 3. The vicinity of the anodized film 12 is locally alkaline, and the anodized film 12 is dissolved as shown in FIG. 5(c). In particular, in the areas of the film defects 13, defects are exposed, and the current feeding solution 6 penetrates into the exposed defects 15. At the same time, positive charge is supplied into the aluminum foil 11 from the current feeding electrode 5 through the current feeding solution 6.

Consequently, in the second anodizing step, a voltage higher than the voltage of the first anodizing step is applied, and an anodized film is formed on the surface of the aluminum foil after the current feeding step. Thus, the anode foil is formed continuously.

Table 1 shows bath voltage characteristics in the current feeding cell 3 and the folding strength characteristics of anode foils in embodiments 1 to 6 of the invention obtained by varying the adding step and adding amount of alkaline metal and the anode foil obtained by the conventional manufacturing method. The folding strength was measured according to the method of EIAJ.

TABLE 1

|  | Adding step | Ion type | Concentration | Bath voltage | Folding strength |
| --- | --- | --- | --- | --- | --- |
| Embodiment 1 | Immersion cell | Sodium | 0.1 ppm | 27 V | 6 times |
| Embodiment 2 |  |  | 1 ppm | 10.2 V | 20 times |
| Embodiment 3 |  |  | 10 ppm | 9.5 V | 22 times |
| Embodiment 4 | Current feeding cell | Sodium | 0.1 ppm | 24 V | 8 times |
| Embodiment 5 |  |  | 1 ppm | 9.8 V | 22 times |
| Embodiment 6 |  |  | 10 ppm | 9.0 V | 23 times |
| Prior art | No addition of alkaline metal ion |  |  | 30 V | 4 times |

As clear from this Table 1, in the anode foils of embodiments 1 to 6, excellent effects are obtained in the points of lowering of bath voltage in the current feeding cell 3 and prevention of hydrogen embrittlement. That is, by adding sodium ions by 0.1 ppm or more as alkaline metal ions in the immersion cell 2 or current feeding cell 3, the resistance of the anodized film 12 can be lowered, and the bath voltage is decreased, thereby preventing hydrogen embrittlement and increasing the amount of feeding current. Moreover, these effects are similarly obtained in the other alkaline metal ions such as Li, K, Rb, and Cs. Since alkaline metal ions are electrically fixed on the surface of the aluminum foil 11 during current feeding, similar effects are obtained regardless of the material of the current feeding electrode 5.

Addition of alkaline metal ions is easily realized by adding an alkaline metal compound in the immersion cell 2 or current feeding cell 3. Alkaline metal ions are fixed near the surface of the aluminum foil 11 electrically in the current feeding cell 3. Accordingly, if alkaline metal ions are directly added in the current feeding cell 3, they are not dispersed in the current feeding solution 6, but effects of alkaline metal ions on the current feeding solution 6 are smaller by adding alkaline metal ions in the immersion cell 2 The upper limit of concentration of the alkaline metal ions is determined by the conductivity and pH of the current feeding solution 6 and the life of the current feeding electrode 5 of the current feeding cell 3.

What is claimed is:

1. A method for making an anode foil for an aluminum electrolytic capacitor comprising:

a first anodizing step of forming a first anodized film on a surface of an aluminum foil, an immersion treatment step of immersing the aluminum foil after said first anodizing step in an aqueous solution containing an alkaline metal compound, a current feeding step of feeding an electric current to the aluminum foil after said immersion treatment step in a current feeding solution in a current feeding cell disposing a current feeding electrode connected to an anode of a direct-current power source, to expose defects included in the first anodized film, and a second anodizing step of restoring the defects and forming a second anodized film on a surface of the aluminum foil after said current feeding step by applying a higher voltage than a voltage in said first anodizing step.

2. The method for making an anode foil for an aluminum electrolytic capacitor of claim 1, wherein said alkaline metal compound is any compound of Li, Na, K, Rb, or Cs.

3. The method for making an anode foil for an aluminum electrolytic capacitor of claim 1, wherein a concentration of said alkaline metal compound to be added in the aqueous solution in said immersion treatment step is 0.1 ppm or more.

4. A method for making an anode foil for an aluminum electrolytic capacitor comprising:

a first anodizing step of forming an anodized film on a surface of an aluminum foil, a current feeding step of feeding an electric current to the aluminum foil after said first anodizing step in a current feeding solution containing an alkaline metal compound in a current feeding cell disposing a current feeding electrode connected to an anode of a direct-current power source, and a second anodizing step of forming an anodized film on a surface of the aluminum foil after said current feeding step by applying a higher voltage than a voltage in said first anodizing step.

5. The method for making an anode foil for an aluminum electrolytic capacitor of claim 4, wherein said alkaline metal compound is any compound of Li, Na, K, Rb, or Cs.

6. The method for making an anode foil for an aluminum electrolytic capacitor of claim 4, wherein a concentration of said alkaline metal compound to be added in the current feeding solution in said current feeding step is 0.1 ppm or more.

* * * * *